(12) United States Patent
Clark

(10) Patent No.: US 7,861,428 B1
(45) Date of Patent: Jan. 4, 2011

(54) PUSH STICK WITH SLIDE-OUT RULER

(75) Inventor: Scott L. Clark, Boone, IA (US)

(73) Assignee: Allen IP Inc., Huxley, IA (US)

( * ) Notice: Subject to any disclaimer, the term of this patent is extended or adjusted under 35 U.S.C. 154(b) by 0 days.

(21) Appl. No.: 12/204,516

(22) Filed: Sep. 4, 2008

(51) Int. Cl.
*B43L 7/033* (2006.01)
*B27B 25/10* (2006.01)

(52) U.S. Cl. ............... 33/427; 33/42; 33/464; 83/436.2

(58) Field of Classification Search ............ 33/42, 33/427, 464, 640; 83/436.2
See application file for complete search history.

(56) References Cited

U.S. PATENT DOCUMENTS

| | | | | |
|---|---|---|---|---|
| 659,513 | A * | 10/1900 | Dubus | .................... 33/353 |
| 2,410,467 | A | 11/1946 | Valentine | |
| 2,839,100 | A | 6/1958 | Valicenti | |
| 3,656,237 | A * | 4/1972 | Killgrove | .................... 33/27.04 |
| 3,738,009 | A * | 6/1973 | Kuwada | .................... 33/27.03 |
| 3,978,587 | A * | 9/1976 | Baugh | .................... 33/433 |
| 4,001,903 | A | 1/1977 | Hay | |
| 4,348,925 | A | 9/1982 | Manweiler | |
| 4,370,909 | A | 2/1983 | Jennings | |
| 4,485,711 | A | 12/1984 | Schnell | |
| D278,022 | S | 3/1985 | Ash | |
| 4,603,612 | A | 8/1986 | Atkins | |
| 4,638,564 | A * | 1/1987 | Burrows | .................... 33/628 |
| 5,016,509 | A | 5/1991 | Stottman | |
| 5,377,418 | A * | 1/1995 | Anderson | .................... 33/478 |
| 5,692,425 | A | 12/1997 | Sterling | |
| 5,782,007 | A * | 7/1998 | Harris | .................... 33/768 |
| 5,813,126 | A * | 9/1998 | Dahl | .................... 33/474 |
| 5,894,777 | A | 4/1999 | Sterling | |
| 6,044,740 | A | 4/2000 | Werkheiser | |
| 6,135,521 | A | 10/2000 | Wirth, Jr. et al. | |
| 6,732,623 | B1 | 5/2004 | Jennings | |
| 6,757,984 | B2 * | 7/2004 | Harris | .................... 33/494 |
| 7,020,978 | B1 * | 4/2006 | Nelson | .................... 33/760 |
| 7,174,650 | B1 * | 2/2007 | Marshall | .................... 33/427 |
| D561,791 | S * | 2/2008 | Kozina et al. | .................... D15/142 |
| 7,540,224 | B2 * | 6/2009 | Wang | .................... 83/436.2 |
| 2006/0123961 | A1 | 6/2006 | Fontaine | |

* cited by examiner

*Primary Examiner*—Christopher W Fulton

(57) ABSTRACT

A push stick comprises a body providing a bottom surface and a heel member that protrudes beyond the bottom surface; and a slide-out ruler that is selectably positionable to extend from the body. The push stick is a safety device that can be used to push a workpiece past a blade or bit while keeping an operator's hands out of harm's way. The ruler allows an operator to use the push stick to make measurements, such as setting the height of a cutting tool relative to a workpiece table.

15 Claims, 3 Drawing Sheets

SECTION A-A

PUSH STICK WITH SLIDE-OUT RULER

TECHNICAL FIELD

The invention relates to woodworking equipment. More particularly, the invention relates to push sticks.

BACKGROUND

In operations such as the ripping, routing or jointing of a workpiece, an operator should use safely equipment to prevent accidental injuries. One type of safety equipment is a push stick, which is a handheld tool including a notch which allows the operator to feed the workpiece remotely to keep the operator's hands away from dangerous moving parts of the workpiece operation device such a cutting blades or bits. Push sticks also allow the operator to hold a workpiece precisely, such as tightly against the table top of a table saw, while performing the workpiece operation.

SUMMARY

In general, the invention is directed to a push stick including a ruler. The push stick is a safety device that can be used to push a workpiece past a blade or bit while keeping an operator's hands out of harm's way. The ruler allows an operator to use the push stick to make measurements, such as setting the height of a cutting tool relative to a workpiece table.

In one embodiment, the invention is directed to a push stick comprising a body providing a bottom surface and a heel member that protrudes beyond the bottom surface; and a slide-out ruler that is selectably positionable to extend from the body.

In another embodiment, the invention is directed to a push stick comprising a body providing a measurement surface a bottom surface and a heel member that protrudes beyond the bottom surface; a handle fixed to the body; a slide-out ruler that is selectably positionable to extend from the body in a direction that is about perpendicular to the measurement surface; and a locking mechanism operable to secure the ruler at a selected position relative to the body.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
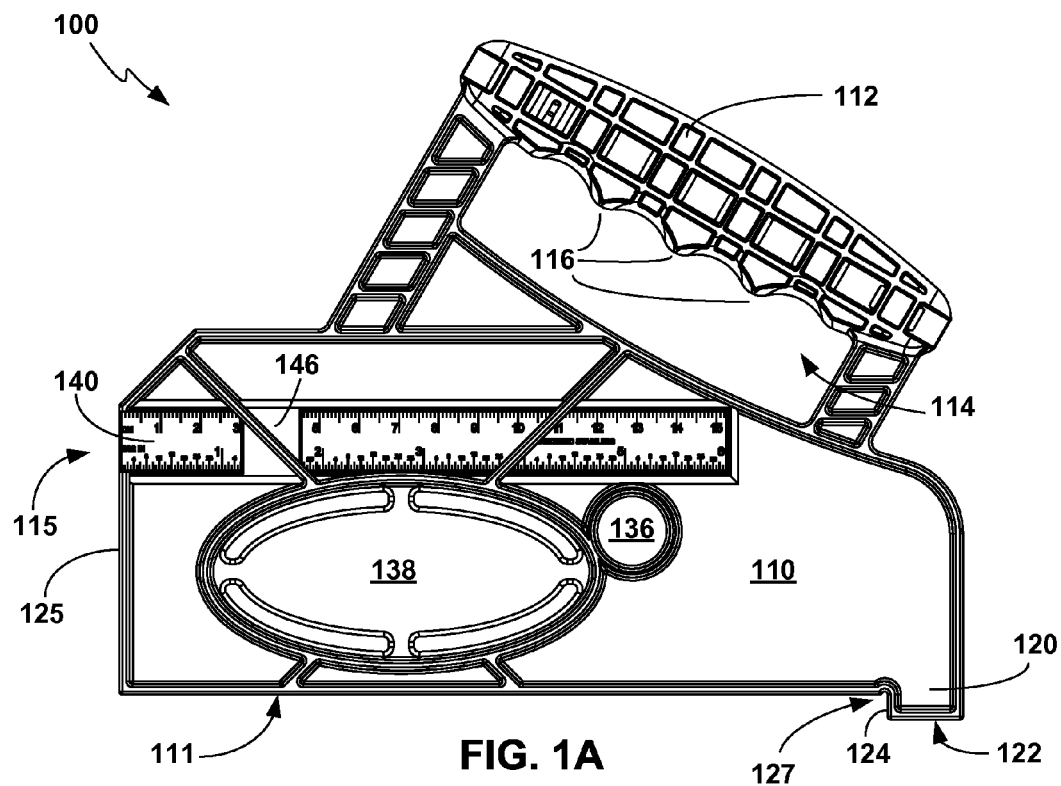
FIGS. 1A and 1B illustrate a push stick including a slide-out ruler.
Figure 1B:
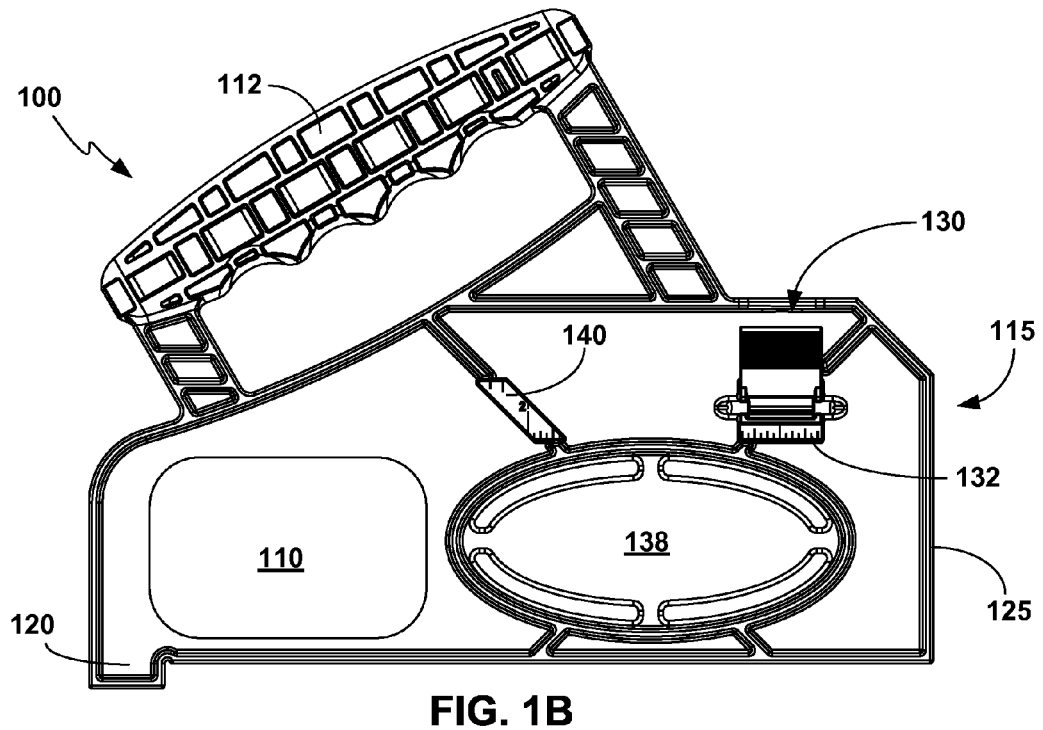
Figure 2:
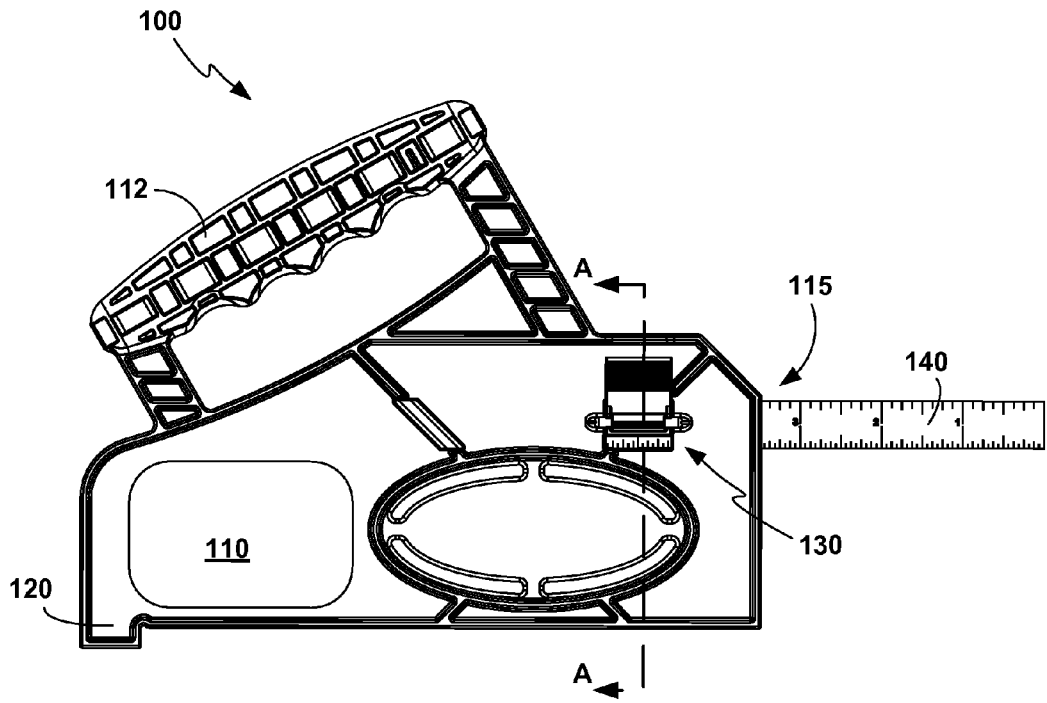
FIG. 2 illustrates the push stick of FIGS. 1A and 1B with the slide-out ruler in an extended position.

FIGS. 1A and 1B illustrate push stick 100. Push stick 100 is a safety device that can be used to push a workpiece past a blade or bit. Push stick 100 includes slide-out ruler 140, which may be used to measure the height of a cutting tool such as a blade of a table saw or a router bit. FIG. 2 illustrates push stick 100 with slide-out ruler 140 in an extended position. Push stick 100 includes only a few discrete components: body 110, which is integrated with handle 112 as a single component, ruler 140, magnet 136 and locking tab 130.

Figure 3A:
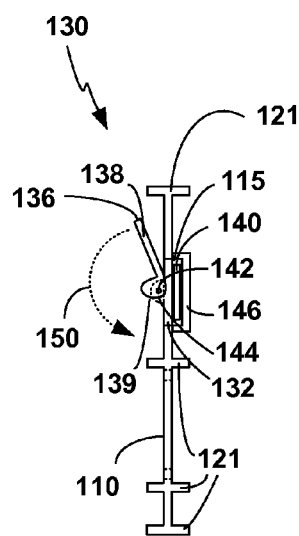
FIGS. 3A and 3B are conceptual illustrations of a cross section of push stick of FIGS. 1A and 1B include a cam locking mechanism operable to secure the slide-out ruler at a selected position.
Figure 3B:
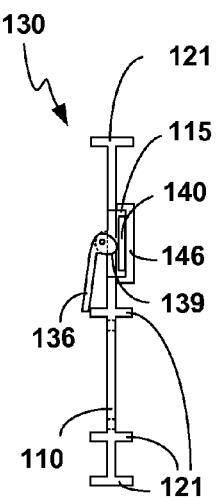

Body 110 provides a generally flat bottom surface 111 and heel member 120 that protrudes beyond the bottom surface 111. Heel member 120 provides forward facing surface 124 that combines with bottom surface 111 to form notch 127, which operates to engage an edge of a workpiece. In some instances, heel member 120 may also facilitate tracking of the push stick 100 within the guide channel of a worktable. Body 110 is generally planer, but also includes cross-members for additional stiffness. For example, cross-members 121 are shown in FIGS. 3A and 3B. Body also includes an ornamental oval 138 that is suitable for branding of push stick 100.

Handle 112 is suitable for a user to grip push stick 100 when performing a workpiece operation. Handle 112 includes handle grip 114 including raised sections 116, which protrude outwardly from handle 112. Handle 112 is integrated with body 110 as a single component. In other embodiments, body 110 and handle 112 may be separate components.

In the configuration shown in FIGS. 1A and 1B, body 110 and handle 112 may be a polymeric material formed using injection molding techniques. Suitable polymeric materials that can be utilized to form the body 110 and handle 112 include acrylonitrile butadiene styrene (ABS), polypropylene (PP), polyvinylchloride (PVC), or nylon. Other materials may also be suitable. A suitable material for body 110 and handle 112 should be relatively rigid material capable of resisting bending or flexing resulting from pressure exerted thereon by the user. In certain embodiments, for example, body 110 and handle 112 may be fabricated from a glass filled nylon or polycarbonate material. In other embodiments, fabrication techniques other than injection molding may also be used to fabricate body 110 and handle 112.

Slide-out ruler 140 fits within slot 115, which is formed by body 110. In a retracted position (FIGS. 1A and 1B), ruler 140 fits entirely within the profile of body 110. When extended, ruler 140 is suitable for making measurements, such as measuring the height of a cutting blade or bit relative to a workpiece table. Ruler 140 is extendable from body 110 in a direction such that is does not intersect with a plane defined by bottom surface 111. In this manner, the position of ruler 140 will not interfere with the ability of push stick 100 to engage a workpiece. More specifically, ruler 140 is extendable from body 110 in a direction that is about perpendicular to generally flat measurement surface 125. Measurement surface 125 provides a reference point useful when making measurements with ruler 140, and is about perpendicular with bottom surface 111.

Locking mechanism 130 is operable to secure ruler 140 at a selected position in slot 115 relative to body 110. For example, when setting the height of a cutting tool, a user may first secure ruler 140 in an extended position selected to match the desired height of the cutting tool using locking mechanism 130. Then the user can use the position of measurement surface 125 relative to the distal end of ruler 140 to accurately set the height of the cutting tool.

The operation of locking mechanism 130 is shown in detail in FIGS. 3A and 3B, which represent cross-section A-A of push stick 100 as shown in FIG. 2. Locking mechanism 130 includes latch 136 with finger tab 138 and cam 139. Latch 136 pivots about pin 142, which is fixed relative to body 110 by protrusions 144. For example, pin 142 may be a metallic wire.

Rotation of latch 136 in direction 150 moves locking mechanism 130 from an open position (FIG. 3A) to a closed position (FIG. 3B). The rotation of latch 136 in direction 150 causes cam 139 to pivot about pin 142 to secure ruler 140 within slot 115. In order to secure ruler 140 relative to body 110, cam 139 passes through aperture 132 in body 110 to press ruler 140 against rib 146 of body 110, which forms slot 115.

Body 110 also contains magnet 136, which functions to secure ruler 140 in slot 115. More specifically, ruler 140 includes a ferrous metal, such a stainless steel. The ferrous metal of ruler 140 experiences an attractive magnetic force from magnet 136. The magnetic force of magnet 136 ensures a frictional force between ruler 140 and slot 115 when rule 140 is in a retracted position. This frictional force mildly inhibits the motion of ruler 140 from extending from slot 115 when ruler 140 is in a retracted position. Magnet 136 may be secured to body 110 using any suitable technique, e.g., magnet 136 may be secured to body 110 via a press fit or an adhesive. In other embodiments, magnet 136 may be molded directly into body 110. Other embodiments may not include a magnet; also in some embodiments ruler may not include a ferrous metal, but may be made of a different material such as wood, metal, aluminum, a polymer, injection molded polymer or other material.

Figure 4:
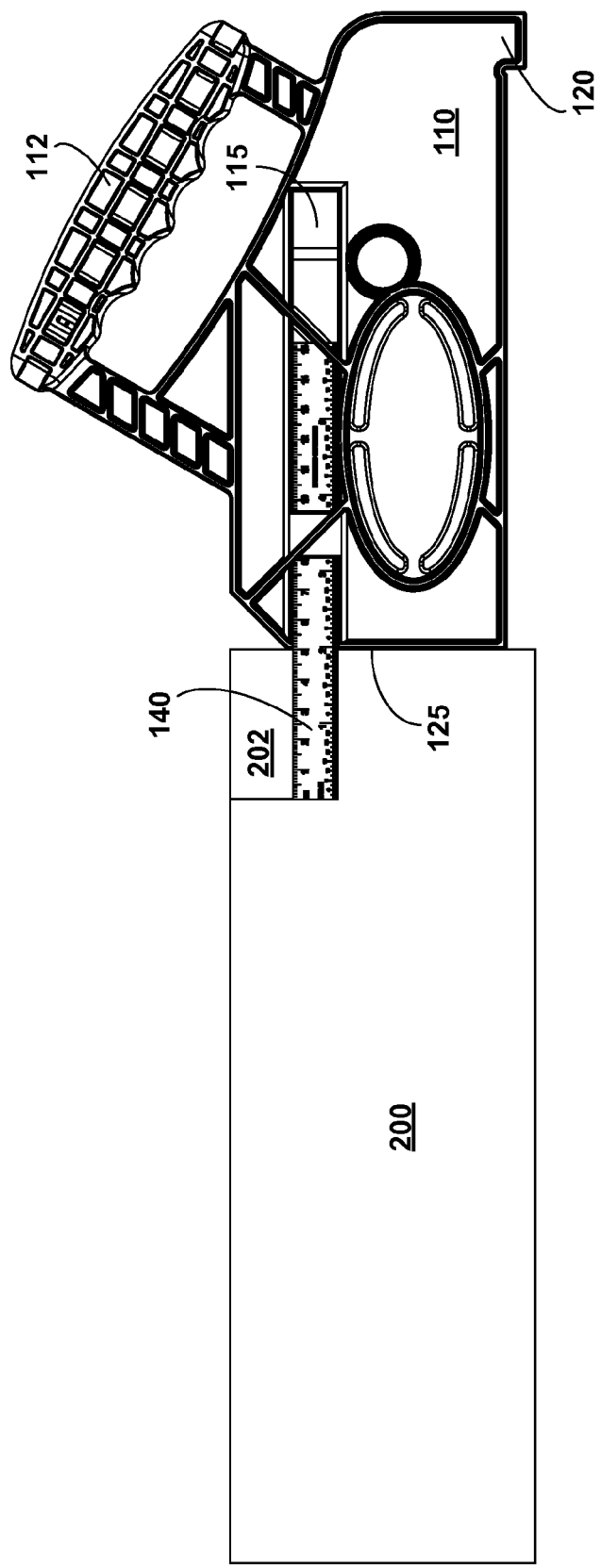
FIG. 4 illustrates the push stick of FIGS. 1A and 1B with the slide-out ruler in an extended position to measure a workpiece.

FIG. 4 illustrates push stick 100 shown in an extended position to measure notch 202 in workpiece 200. As shown in FIG. 4, generally flat measurement surface 125 is aligned with an edge of workpiece 200, while ruler 140 is extended to measure the depth of notch 202. As previously described, push stick 100 may be used to perform any number of measurements, including but not limited to, measuring the depth of a cutting tool, such as a table saw blade or router bit.

Various embodiments of the invention have been described. In addition, modifications can be made to the described embodiments within the spirit of the invention. For example, the described embodiments included push sticks including injection molded polymeric components. However, other materials and manufacturing techniques may also be used to provide push stick including a slide-out ruler. For example, such push stick may be made from any of a variety of suitable materials including, but not limited to, metal, wood, composites and ceramics. These and other embodiments are within the scope of the following claims.

The invention claimed is:

1. A push stick comprising:
   a body providing a bottom surface and a heel member that protrudes beyond the bottom surface;
   a slide-out ruler that is selectably positionable to extend from the body;
   wherein the ruler includes a ferrous metal, further comprising a permanent magnet fixed to the body that applies an attractive magnetic force on the ruler to create a frictional force between the ruler and the body that mildly inhibits the ruler from extending from the body when the ruler is in a retracted position.

2. The push stick of claim 1, wherein the ruler is extendable in a direction such that does not intersect with a plane defined by the bottom surface.

3. The push stick of claim 1, wherein the ruler fits within a slot formed in the body.

4. The push stick of claim 1, wherein the measurement surface is a flat measurement surface, wherein the ruler is extendable in a direction that is about perpendicular to the measurement surface.

5. The push stick of claim 4, wherein the measurement surface is perpendicular to the bottom surface.

6. The push stick of claim 1, wherein the locking mechanism includes a cam to secure the ruler.

7. The push stick of claim 1, wherein the handle is an integral part of the body.

8. The push stick of claim 1, wherein the body is formed from a single piece of material using an injection molding process.

9. A push stick comprising:
   a body providing a measurement surface, a bottom surface and a heel member that protrudes beyond the bottom surface;
   a handle fixed to the body;
   a slide-out ruler that is selectably positionable to extend from the body in a direction that is about perpendicular to the measurement surface;
   a locking mechanism operable to secure the ruler at a selected position relative to the body; and
   wherein the ruler includes a ferrous metal, further comprising a permanent magnet fixed to the body that applies an attractive magnetic force on the ruler to create a frictional force between the ruler and the body that mildly inhibits the ruler from extending from the body when the ruler is in a retracted position.

10. The push stick of claim 9, wherein the ruler fits within a slot formed in the body.

11. The push stick of claim 10, wherein the locking mechanism includes a cam to secure the ruler by pressing the ruler against a portion of the body forming the slot.

12. The push stick of claim 9, wherein the body and the handle are formed from a single piece of material using an injection molding process.

13. The push stick of claim 9, wherein the measurement surface provides a reference point for measuring an object using the slide-out ruler.

14. The push stick of claim 9, wherein the slide-out ruler is positionable such that it first entirely within a profile of the body.

15. The push stick of claim 9, wherein the measurement surface provides a reference point for measuring an object using the slide-out ruler.

* * * * *